United States Patent [19]

Nissl

[11] 4,104,921
[45] Aug. 8, 1978

[54] PIEZOELECTRIC ACCELERATION TRANSDUCER

[75] Inventor: Norbert Nissl, Aresing, Fed. Rep. of Germany

[73] Assignee: Messerschmitt-Boelkow-Blohm GmbH, Munich, Fed. Rep. of Germany

[21] Appl. No.: 747,601

[22] Filed: Dec. 6, 1976

[30] Foreign Application Priority Data

Dec. 13, 1975 [DE] Fed. Rep. of Germany ....... 2556298

[51] Int. Cl.² ............................................. G01P 15/08
[52] U.S. Cl. .................................. 73/517 R; 310/329
[58] Field of Search ............... 73/517 R, 516 R, 71.2; 102/70.2 GA; 310/8.4, 8.7, 9.1, 8.3, 329

[56] References Cited

U.S. PATENT DOCUMENTS 3,006,280 10/1961 Rogers et al. ................. 73/517 R X
3,407,667 10/1968 Doeringsfeld ..................... 73/514 X
3,585,419 6/1971 Andre .................................. 310/8.4

FOREIGN PATENT DOCUMENTS 169,904 9/1965 U.S.S.R. ................. 73/517 R

*Primary Examiner*—James J. Gill
*Attorney, Agent, or Firm*—W. G. Fasse; W. W. Roberts

[57] ABSTRACT

A piezoelectric acceleration transducer has a piezoelectric element with a plane surface arranged in contact with a mass. The mass and the piezoelectric element are held in fixed relationship to each other by a support structure arranged in such a manner that inertia forces effective on said mass are directed to be effective perpendicularly on the plane surface of the piezoelectric element. A bearing point or line is provided between the mass and the support structure in such a position that the directional sensitivity of the transducer may be determined by said position.

16 Claims, 13 Drawing Figures

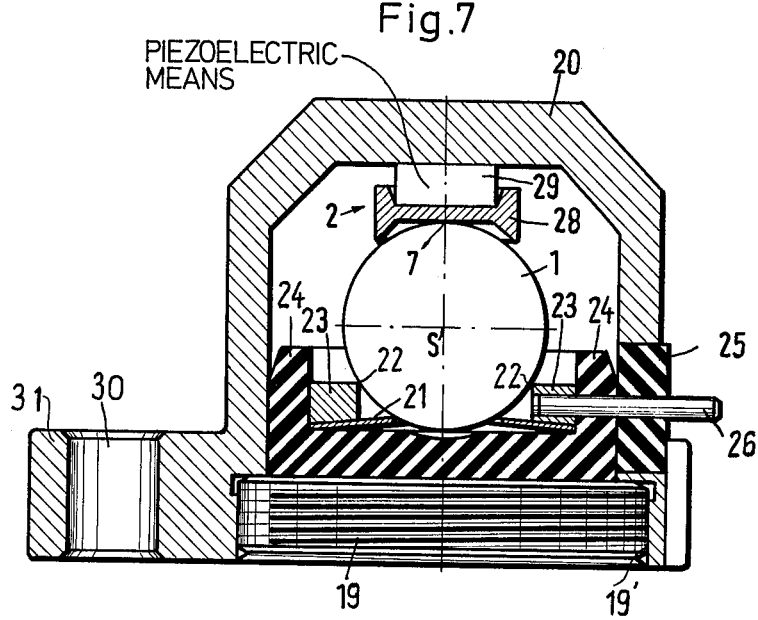
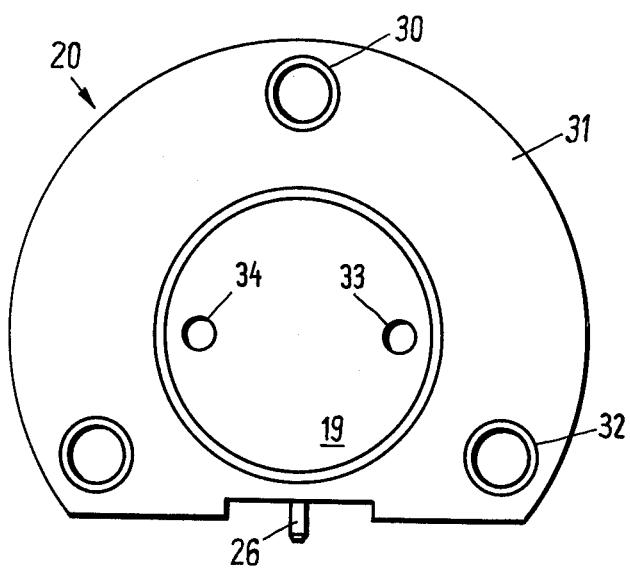

PIEZOELECTRIC ACCELERATION TRANSDUCER

BACKGROUND OF THE INVENTION

The present invention relates to a piezoelectric acceleration transducer, more specifically, to transducers in which a piezoelectric element and at least one inertia mass are arranged so that the mass may act on the element.

German Patent Publication (DAS) 2,132,830 discloses a known piezoelectric acceleration transducer which is constructed to detect accelerations not only in a certain direction, but over a wide angle range. For this purpose, the piezoelectric element of the known transducer comprises a spherical internal recess and a likewise spherical inertia mass engaging said spherical recess. The recess and the mass both have the same radius. Due to the spherical shape of the piezoelectric element and of the inertia mass it is said that the electrical signal derived from the piezoelectrical element is substantially independent of the direction of the effective acceleration forces over a predetermined angular range.

However, the extent to which the sensitivity of such an acceleration transducer is independent of the angle under which forces are effective and the extent to which such sensitivity may be predetermined, depend essentially on the mechanical manufacturing precision. It is especially important how precisely the spherical surfaces of the piezoelectric element and of the inertia mass correspond to each other. However, piezoelectric elements with spherical surfaces are hard to manufacture even if the required precision is low. Besides, it is practically impossible to achieve 100% correspondence or conformance of the spherical surfaces of the piezoelectric element and of the inertia mass. Therefore, the bearing point or points between the spherical mass and the piezoelement will take up one or several undefined locations so that the exact directional sensitivity of the acceleration transducer will differ from one transducer to the other. Accordingly it is necessary to determine the directional sensitivity by making measurements for each transducer individually.

OBJECTS OF THE INVENTION

In view of the above, it is the aim of the invention to achieve the following objects singly or in combination:
- to overcome the above outlined difficulties of the prior art, more specifically, to avoid the contact of spherical surfaces in a piezoelectrical transducer;
- to construct a piezoelectric acceleration transducer in such a manner that its directional sensitivity may be exactly defined in a predetermined angular range;
- to construct a piezoelectric acceleration transducer in such a manner that its manufacture is simpler and less expensive than heretofore while simultaneously achieving a uniform directional sensitivity for transducers of the same type; and
- to construct a piezoelectric acceleration transducer in such a manner that it is possible to define the response characteristic by simple expedients such as varying the location of bearing points between the inertia mass and the piezoelectric element.

SUMMARY OF THE INVENTION

According to the invention, there is provided a piezoelectric acceleration transducer, wherein the inertia mass contacts a plane surface of the piezoelectric element, either directly or through a bearing disk. At least one support element is provided for fixing the position of the inertia mass in such a manner that any forces effective on the inertia mass are deflected so that they are effective on the piezoelectric element in a direction extending perpendicularly to the plane surface of the piezoelectric element. The support element or structure determines the position of the contact point or contact points between the inertia mass and the piezoelectric element. Such position or positions in turn determine the directional sensitivity of the acceleration transducer.

A directed force acting on the inertia mass, for example an inertia force will always be divided into two components by the arrangement of the piezoelectric element and the supporting element as taught by the invention. The division of the force is accomplished so that one force component is directed from the center of gravity of the inertia mass toward the point of contact between the inertia mass and the piezoelectric element. The other force component is directed from said center of gravity toward the point of contact between the spherical mass and the supporting element or structure. Since the entire structure is rigid, it will retain its geometry substantially unchanged even under the influence of dynamic forces, for example, when acceleration forces are effective. Accordingly, it is possible to assume for the calculation of the pickup characteristic that a quasi static situation is involved which will result in a good approximation. For this purpose it is possible to represent each force effective on the inertia mass by a vector, which in turn is divided into two components independently of the size and direction of said vector. These components will always correspond to the above mentioned vector components and extend through the point of contact between the inertia mass and the piezoelectric element and through the point of contact between the inertia mass and the supporting structure. Thus, it is possible to calculate the vector proportion directed onto the piezoelectric element by simple vector addition. The ratio of the force acting on the center of gravity of the inertia mass to the proportion of the force deflected onto the piezoelectric element then provides the response characteristic of the acceleration transducer as a function of the direction of the corresponding force effective on the intertia mass.

The position of the points of contact between the inertia mass and the support elememt determines the size of the force component taken up by the support element if the force effective on the inertia mass is maintained constant. Thus, it is possible to also ascertain the size of the remaining force component effective on the piezoelectric element. Accordingly, it is possible to change the response characteristic of the acceleration transducer in a defined manner by varying these points of contact between the support structure and the inertia mass. Stated differently, the response characteristic may be varied by varying the support element or structure.

BRIEF FIGURE DESCRIPTION

In order that the invention may be clearly understood, it will now be described, by way of example, with reference to the accompanying drawings, wherein.

Figure 1A:
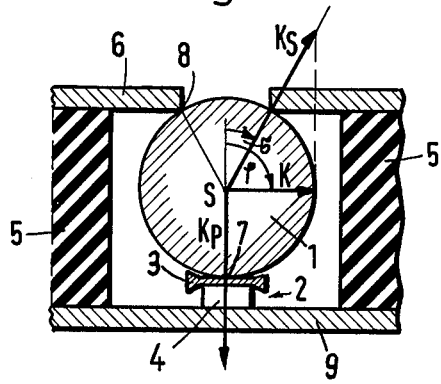
FIG. 1a is a sectional view through one embodiment of an acceleration transducer according to the invention in which a spherical inertia mass, is held by a support plate provided with a cylindrical hole the edge of which contacts the spherical mass.
Figure 2A:
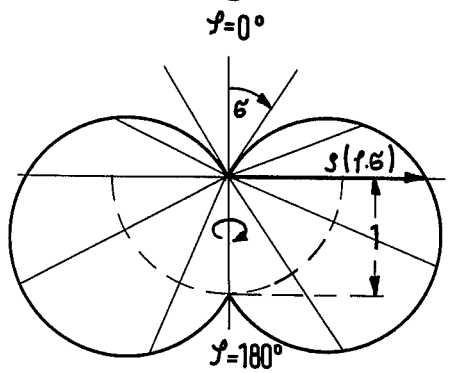
Figure 1B:
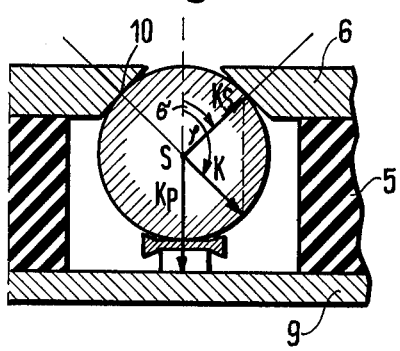
FIG. 1b is a structure similar to that of FIG. 1a, however, the aperture in the support plate has a conical or slanted side wall.
Figure 2B:
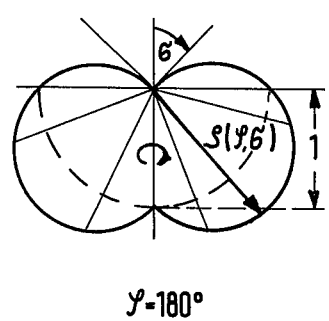
Figure 1C:
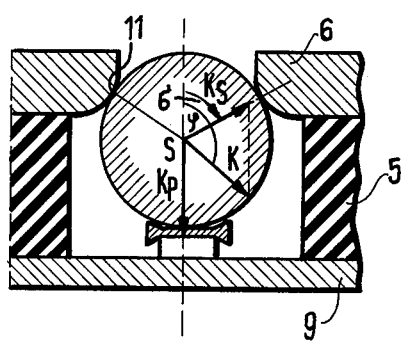
FIG. 1c is again a structure similar to those shown in the two preceding figures with an aperture in the support plate provided with a rounded or curved edge in contact with the inertia mass.
Figure 2C:
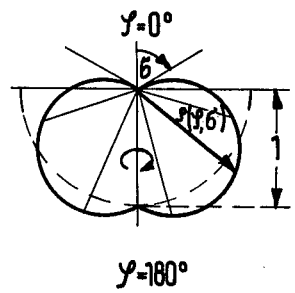
Figure 3:
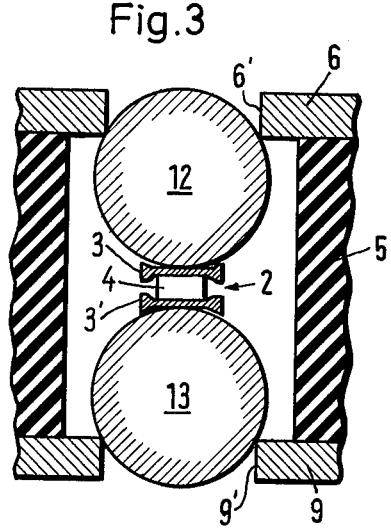
Figure 4:
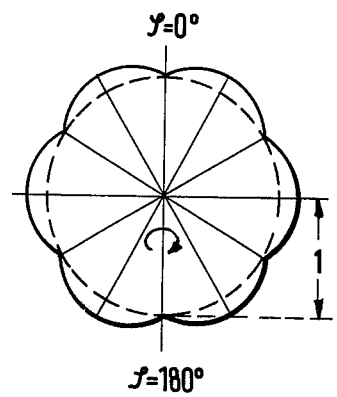
Figure 5:
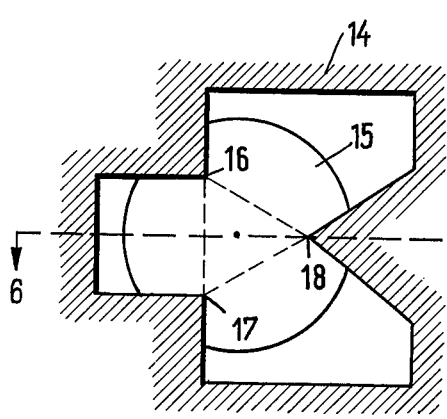
Figure 6:
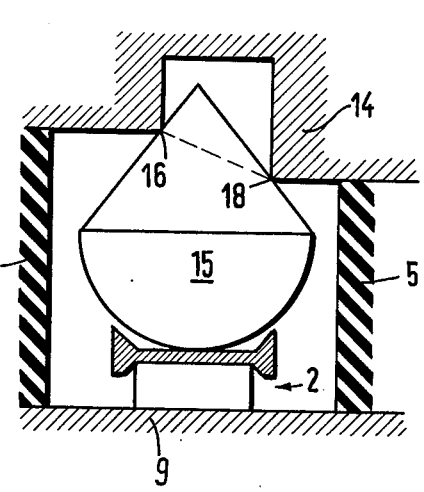
Figure 9:
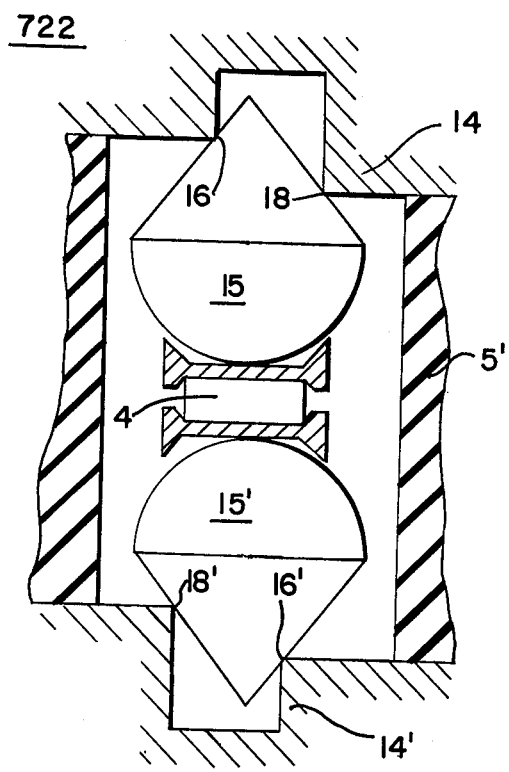

FIGS. 2a, 2b and 2c: illustrate the response characteristic for the respective embodiments shown in FIGS. 1a, 1b, and 1c;

FIG. 3 is a sectional view similar to that of FIG. 1, however employing two spherical inertia masses in contact with a respectively constructed support housing and in contact with the piezoelectric element arranged between the two masses;

FIG. 4 illustrates the response characteristic of the transducer of FIG. 3;

FIG. 5 illustrates a plan view, partially in section, through a transducer in which the inertia mass is partially spherical and partially conical and wherein the supporting structure provides three support points for the mass;

FIG. 6 is a sectional view along section line 6 — 6 in FIG. 5;

FIG. 7 is a sectional view through an embodiment similar to that of FIG. 1, but showing a housing structure plus a spring support for the inertia mass;

FIG. 8 is a view substantially against the bottom of the embodiment illustrated in FIG. 7; and FIG. 9 is a sectional view of a modification of the structure of FIG. 6.

DETAILED DESCRIPTION OF PREFERRED EXAMPLE EMBODIMENTS:

FIG. 1a illustrates a sectional view through one embodiment of an acceleration transducer according to the invention. An electrically conducting spherical inertia mass 1 is supported in contact with a piezoelectric element 2 in a housing comprising a base plate 9, insulating side wall means 5 and a support plate 6. The base plate 9, the insulating walls 5, and the support plate 6 are held together by conventional means not shown, for example, screws or adhesive. The inertia mass 1 is for instance, a steel ball of substantial hardness. Similarly the base plate 9 and the support plate 6 may be made of steel, whereby especially the support plate 6 will be of substantial hardness. The pressure sensitive piezoelectric element 2 has plane surfaces and rests on the base plate 9. The piezoelectric element 2 may comprise, for example, a piezoelectric ceramic plate 4 or a piezoelectric crystal. If desired, an electrically conducting hard bearing disk 3 may be inserted between the piezoelectric plate or crystal 4 and the mass 1.

The bearing disk 3 is preferably provided with a rim extending around the circumference of the disk 3 upwardly, and if desired, also downwardly. The rim of the disk 3 extends upwardly just sufficient so that the spherical mass 1 does not press against the rim when the mass is located in a central position. However, the rim is sufficiently high to make sure that a parallel displacement of the bearing disk 3 and of the piezoelectric crystal or ceramic plate is assured when the spherical mass is subject to small horizontal displacements due to the elasticity of the individual elements of the structure.

The support or holding element 6 in FIG. 1a has a cylindrical opening 8 forming a circular line of contact between the holding plate 6 and the sphere 1, thereby pressing the mass of the sphere 1 onto the piezoelectric element. The base 9, the insulating body 5 and the supporting or holding elements 6 are arranged so that a defined bias pressure is applied to the piezoelectric elements 2, said bias pressure constituting a preliminary adjustment, said body 5 providing a spring action.

In FIG. 1b the structure is substantially the same as that in FIG. 1a, except that the aperture 10 in the holding plate has a conical shape, whereby the walls defining the aperture are slanted and the sphere 1 fits into the conical aperture. The same considerations apply to the embodiment of FIG. 1c, wherein the holding plate is provided with an aperture having rounded or curved edges 11. Here again, the sphere 1 reaches somewhat into the aperture to contact the curved edge 11.

A force K acting on the center of gravity S of the spherical mass 1 will be divided into the components $K_p$ and $K_s$ according to the contact point 7 between the spherical mass 1 and the piezoelectric 2 and in accordance with the contacts provided at the edges 8, 10 or 11. The force component $K_p$ determines the magnitude and sign of the piezoelectric loading which may, for example, be measured with a load measuring instrument such as a coulometer connected to the base 9 and to the supporting or holding element 6, both of which are electrically conducting.

For the pick-up or sensitivity characteristic shown in FIGS. 2a, 2b and 2c it is generally and without reservation assumed that only loads with the suitable sign are taken into account. This has the advantage that outputs provided by the piezoelectric element in response to a pressure reduction will be disregarded. Thus, the fact that a piezoelectric element provides output signals of opposite sign in response to pressure increase and in response to pressure decrease, does not affect the operability of the transducer according to the invention.

It has been found that the ratio between the diameters of the apertures 8, 10, and 11 on the one hand, and the diameter of the spherical mass 1 substantially determines the response characteristic of the acceleration transducer according to the invention. As may be seen from FIGS. 2a to 2c, the sensitivity of the transducer relative to lateral acceleration diminishes with an increasing angle $\sigma$. The angle $\sigma$ is shown in FIGS. 1a, 1b, and 1c between the vertical and the force component $K_s$.

As mentioned above, FIGS. 2a to 2c illustrate the ratio of the force component $K_p$ effective on the piezoelectric element to the effective force K representing the respective accelerations to which the transducers are exposed. It will be noted that the response characteristic of the transducers has a rotational symmetry relative to the axis extending through the center of gravity S and the point of contact 7 between the spherical mass 1 and the piezoelectric element 2. The angle between the axis extending through the point 7 and the center of gravity S, and the force K effective on the center of gravity is designated with $\phi$. Thus, the theoretical pick-up or sensitivity characteristic of the example embodiments of FIGS. 1a to 1c may be stated as follows:

$$\rho = \frac{K_p}{K} = \frac{\sin \varphi}{\tan \sigma} - \cos \varphi \text{ for } 0 < \sigma \leq 90°; 0 \leq \varphi \leq 180° \qquad (1)$$

Since the individual elements of the acceleration transducer are not absolutely rigid, small shifts of the contact points between the spherical mass 1 and the supportor holding element 6 will occur when a dynamic load is applied. Thus, it is possible to additionally influence the pick-up or response characteristic of the transducer by a respective formation of the edges of the apertures 8, 10, 11. Thus, for example, a change in the response characteristic can be achieved by simply providing the aperture 10 with a funnel or conical shape or by making the edge rounded as shown in FIG. 2c at 11. Accordingly, it is possible to suppress a change of the response characteristic, for example, with regard to increasing effective forces or to provide such a change of the response characteristic with regard to increasing forces. The embodiments of FIGS. 1b and 1c provide no change of the response characteristic whereas the embodiment of FIG. 1a provides a change of the response characteristic or sensitivity.

In the embodiment of FIG. 3 two spherical masses 12 and 13 are held in a housing in which the base plate 9 is provided with an aperture 9' and the holding plate 6 is provided with an aperture 6', a piezoelectric element 2 is inserted with its two bearing disks 3 and 3' between the two plates 6 and 9 which are separated from each other by a body 5 of insulating material just as in the above described figures. FIG. 4 illustrates the response characteristic of the transducer shown in FIG. 3. The response characteristic is substantially spherical.

FIGS. 5 and 6 show constructions in which the response characteristic of the respective transducer shall not have a rotational symmetric shape as illustrated with reference to FIGS. 1 to 4. For this purpose FIGS. 5 and 6 show that the inertia mass 15 comprises a hemisphere in combination with a circular cone. Three points of contact 16, 17 and 18 are provided between the cone end of the mass 15 and the housing 14. From FIG. 6 it will be noted that the hemispherical end of the mass 15 contacts a bearing disk 3 which in turn contacts the piezoelectric element 2 which in turn contacts the electrically conducting bottom plate 9 of the housing 14. The circular cone end of the mass 15 contacts the electrically conducting cover end of the housing 14. The base 9 and the cover of the housing 14 are again separated by an electrically insulating body 5 as in all the other embodiments. Here again it is possible to calculate the response characteristic of the example embodiment of FIGS. 5 and 6 in a similar manner as has been described above with reference to FIGS. 1a to 1c. The effective force would again be divided into its components and the direction of the component vectors is determined by the location of the contact points between the housing 14 and the mass 15.

FIGS. 7 and 8 illustrate an example embodiment in which the piezoelectric element 29 is subjected to a defined mechanical bias by means of a Belleville spring 21 and a support ring 23 arranged in a housing 20 and insulated from the housing 20 by an insert 24 having a cup shape. A closure 19 having a threaded circumference 19' holds the insert 24 in the housing 20, thereby pressing the support ring 23 against the spherical mass 1 at 22 which in turn presses against a bearing disk 28 with raised rims. The bearing disk 28 holds the piezoelectric element 29 against the housing 20 which is of electrically conducting material. A lead through insulator 25 in the housing 20 holds a terminal 26 in contact with the sphere 1 so that the output of the transducer may be taken off between the terminal 26 and the electrically conducting housing 20. As shown in FIG. 8, the housing 20 is provided with a flange 31 having holes 30, 32 and 35 therein for securing the transducer to a chassis or the like not shown. The cover 19 is provided with dead end holes 33, 34 by means of which the cover 19 may be screwed into the housing 20 by inserting a respectively pronged tool into these holes 33, 34. Due to the spring 21 it is not necessary that the insulating insert 24 is elastically yielding. Incidentally, the electrical contact between the sphere 1 and the terminal 26 is provided through the support ring 23 and the spring 21.

Although the invention has been described with reference to specific example embodiments, it will be appreciated, that it is intended, to cover all modifications and equivalents within the scope of the appended claims.

FIG. 9 illustrates a modification of the arrangement of FIG. 6, wherein a pair of inertia masses 15 and 15' are provided, each mass having a hemispheric portion and a circular, conical portion. The piezoelectric element is sandwiched between the hemispherical portions of these masses. In a manner similar to that shown in FIG. 5, the housing comprises an additional portion 14' contacting the conical portion of the mass 15', at points 16' and 18'. A third contact point (not shown) is also provided, in the manner illustrated in FIG. 5. The arrangement of FIG. 9 is thus formed of a pair of arrangements of the type shown in FIG. 6, in a manner similar to that in which the structure of FIG. 3 was formed from a pair of devices of the type shown in FIG. 1a.

What is claimed is:

1. A piezoelectric acceleration transducer having a directional sensitivity comprising piezoelectric means having a plane surface, mass means contacting said plane surface of said piezoelectric means, support means for said mass means and for said piezoelectric means, said support means comprising substantially rigid bearing means contacting said mass means for urging said mass means in a substantially fixed position against said plane surface, said support means being arranged in such a manner that inertia forces effective on said mass means are divided between a component effective where said bearing means contact said support means and a component effective perpendicularly on said plane surface of said piezoelectric means, said bearing means between said support means and said mass means being located at directional sensitivity determining positions, wherein said support means comprise a housing including housing walls, aperture means in one of said housing walls, said aperture means having dimensions smaller than said mass means thereby forming said bearing means contacting said mass means.

2. The transducer of claim 1, wherein said mass means has a spherical shape.

3. The transducer of claim 1, wherein said mass means has a hemispherical surface toward said piezoelectric means.

4. The transducer of claim 1, wherein said mass means comprise two spheres, said piezoelectric means being arranged between said two spheres.

5. The transducer of claim 1, wherein said mass means has two hemispherical surfaces, said piezoelectric means being arranged between said hemispherical surfaces.

6. The transducer of claim 5, wherein each of said hemispherical surfaces has a circular cone facing away from its respective hemispherical shape.

7. The transducer of claim 1, further comprising bearing disk means interposed between said plane surface of said piezoelectric means and said mass means.

8. The transducer according to claim 7, wherein said bearing disk means comprise a raised rim extending around the bearing disk.

9. The transducer of claim 1, wherein said aperture is circular and has a cylindrical edge in contact with said mass means.

10. The transducer of claim 1, wherein said aperture is circular and has a conical or slanted edge in contact with said mass means.

11. The transducer of claim 1, wherein said aperture is circular and has a curved edge in contact with said mass means.

12. The transducer of claim 1, wherein said mass means has a center of gravity, said aperture being circular and being located concentrically relative to an axis extending perpendicularly to said plane surface of said piezoelectric means and through said center of gravity of said mass means.

13. The transducer of claim 1, wherein said mass means has a center of gravity, said aperture being circular and being located eccentrically relative to an axis extending perpendicularly to said plane surface of said piezoelectric means and through said center of gravity of said mass means.

14. The transducer of claim 1, wherein said bearing means comprise at least three bearing points between said support means and said mass means.

15. A piezoelectric acceleration transducer having a directional sensitivity comprising piezoelectric means having a plane surface, mass means contacting said plane surface of said piezoelectric means, support means for said mass means and for said piezoelectric means, said support means comprising substantially rigid bearing means contacting said mass means for urging said mass means in a substantially fixed position against said plane surface, said support means being arranged in such a manner that inertia forces effective on said mass means are divided between a component effective where said bearing means contact said support means and a component effective perpendicularly on said plane surface of said piezoelectric means, said bearing means between said support means and said mass means being located at directional sensitivity determining positions, and wherein said mass means has a circular conical surface away from said piezoelectric means.

16. A piezoelectric acceleration transducer having a directional sensitivity comprising piezoelectric means having a plane surface, mass means contacting said plane surface of said piezoelectric means, support means for said mass means and for said piezoelectric means, said support means comprising substantially rigid bearing means contacting said mass means for urging said mass means in a substantially fixed position against said plane surface, said support means being arranged in such a manner that inertia forces effective on said mass means are divided between a component effective where said bearing means contact said support means and a component effective perpendicularly on said plane surface of said piezoelectric means, said bearing means between said support means and said mass means being located at directional sensitivity determining positions and, wherein said support means comprise a housing means, insulating means operatively held in position in said housing means and spring means supported by said insulating means for pressing said mass means against said piezoelectric means to hold the latter in said housing, said mass means being made of electrically conducting material, and electrical terminal means arranged in contact with said electrically conducting mass means, said housing also being made of electrically conducting material, said piezoelectric means contacting said housing, whereby a transducer output is provided between said housing means and said terminal means.

* * * * *